(12) United States Patent
Miyamae

(10) Patent No.: US 9,400,620 B2
(45) Date of Patent: Jul. 26, 2016

(54) STORAGE SYSTEM

(71) Applicant: FUJITSU LIMITED, Kawasaki-shi, Kanagawa (JP)

(72) Inventor: Takeshi Miyamae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 14/488,419

(22) Filed: Sep. 17, 2014

(65) Prior Publication Data

US 2015/0113319 A1   Apr. 23, 2015

(30) Foreign Application Priority Data

Oct. 21, 2013   (JP) .................................. 2013-218706

(51) Int. Cl.
| | | |
|---|---|---|
| *G06F 11/00* | (2006.01) | |
| *G06F 3/06* | (2006.01) | |
| *G06F 11/14* | (2006.01) | |
| *G06F 11/10* | (2006.01) | |

(52) U.S. Cl.
CPC ............ *G06F 3/0689* (2013.01); *G06F 3/0604* (2013.01); *G06F 3/0644* (2013.01); *G06F 11/1076* (2013.01); *G06F 11/1088* (2013.01); *G06F 11/1402* (2013.01); *G06F 2211/1061* (2013.01)

(58) Field of Classification Search
CPC ............ G06F 11/1088; G06F 11/1084; G06F 11/1092; G06F 11/1076
See application file for complete search history.

(56) References Cited

U.S. PATENT DOCUMENTS

| | | | | |
|---|---|---|---|---|
| 7,496,785 | B2 | 2/2009 | Elliot et al. | |
| 2003/0126522 | A1* | 7/2003 | English ............... | G06F 11/1076 714/718 |
| 2003/0126523 | A1* | 7/2003 | Corbett ............... | G06F 11/1076 714/718 |
| 2006/0047896 | A1* | 3/2006 | Nguyen ............... | G06F 11/1076 711/112 |
| 2014/0172930 | A1* | 6/2014 | Molaro ............. | G06F 17/30215 707/827 |
| 2014/0380126 | A1* | 12/2014 | Yekhanin ................ | G06F 11/10 714/766 |

FOREIGN PATENT DOCUMENTS

| | | |
|---|---|---|
| JP | 7-200187 | 8/1995 |
| JP | 2005-44182 | 2/2005 |
| JP | 2007-257630 | 10/2007 |

\* cited by examiner

*Primary Examiner* — Yolanda L Wilson
(74) *Attorney, Agent, or Firm* — Fujitsu Patent Center

(57) ABSTRACT

A storage system includes a plurality of data disks that store information, and a parity disk that corresponds to a disk group including some of the plurality of data disks and stores parity information generated on the basis of data of the data disks included in the corresponding disk group. Any of the data disks is included in a plurality of the disk groups.

7 Claims, 14 Drawing Sheets

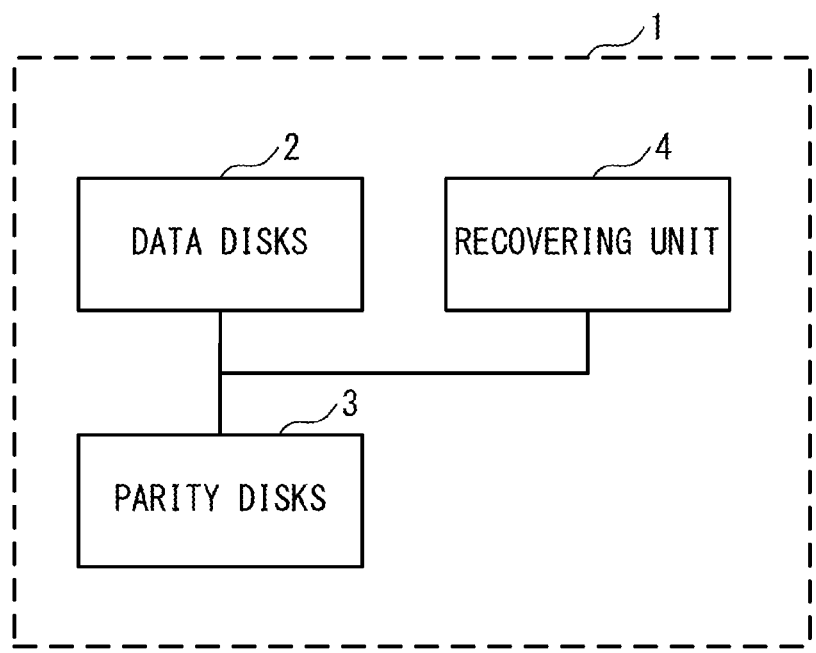
F I G. 1

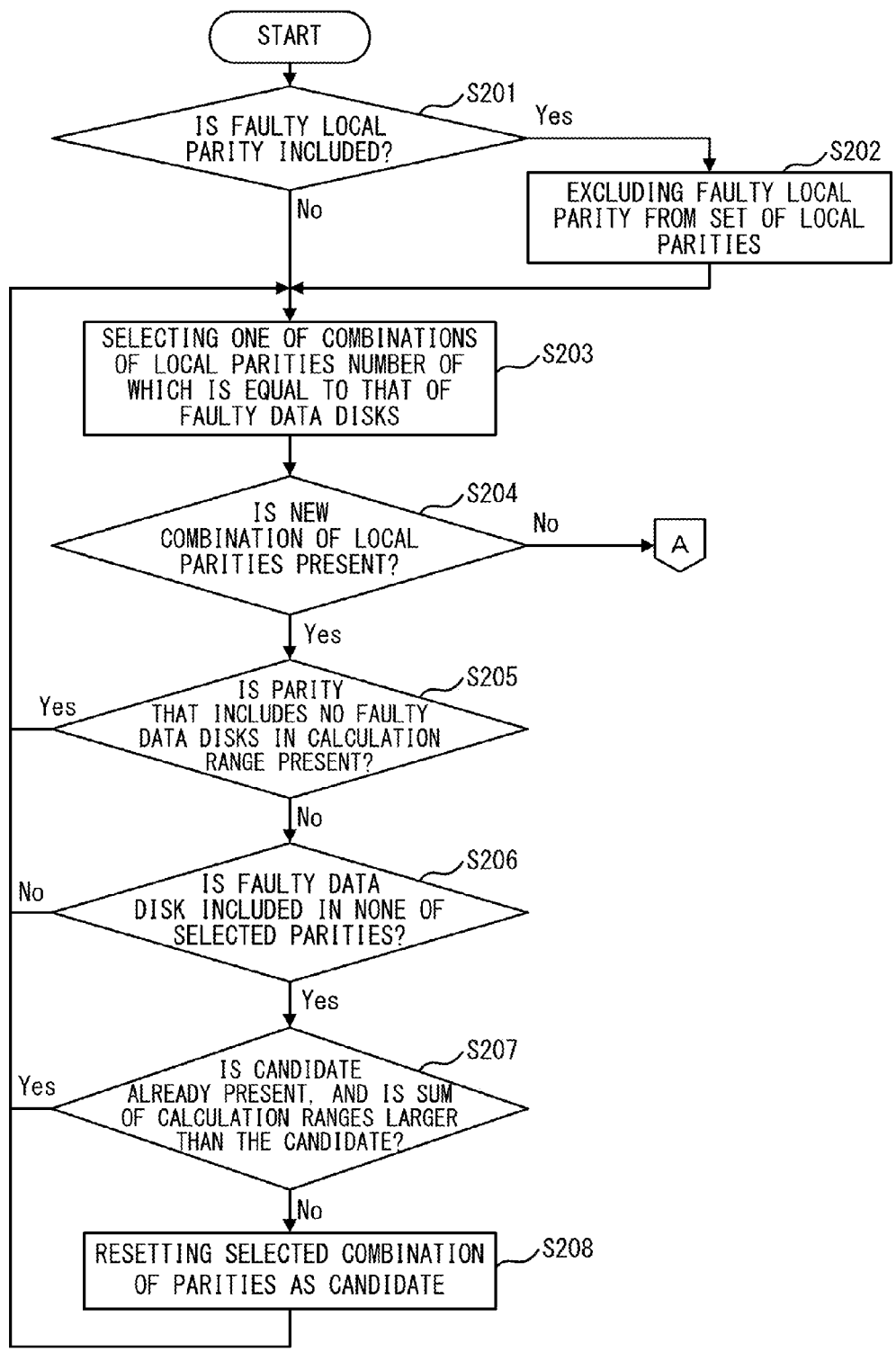
F I G. 10

| | CAPACITY EFFICIENCY | MINIMUM HAMMING DISTANCE OF DATA DISKS | MINIMUM HAMMING DISTANCE OF ALL DISKS | OVERHEAD OF WRITE PROCESS (NUMBER OF I/Os) | RECOVERY OVERHEAD AT TIME OF SINGLE FAULT | RECOVERY OVERHEAD AT TIME OF DOUBLE FAULT | RECOVERY OVERHEAD AT TIME OF TRIPLE FAULT | OVERHEAD OF scrub PROCESS |
|---|---|---|---|---|---|---|---|---|
| COMPARISON EXAMPLE 1 (10, 6) | 0.625 | 7 | 7 | 14 | 10 | 11 | 12 | 15 |
| COMPARISON EXAMPLE 2 (10, 6, 5) | 0.625 | 7 | 6 | 12 | 5 | 10-11 | 12 | 15 |
| FIFTH EMBODIMENT 5 (10, 6, 5) | 0.625 | 7 | 4 | 8 | 5 | 7-8 (7.36) | 9 | 15 |
| REPLICATION (10 × 3) | 0.33 | — | 3 | 3 | 1 | 2 | — | 20 |

FIG. 14

STORAGE SYSTEM

CROSS-REFERENCE TO RELATED APPLICATION

This application is based upon and claims the benefit of priority of the prior Japanese Patent Application No. 2013-218706, filed on Oct. 21, 2013, the entire contents of which are incorporated herein by reference.

FIELD

The embodiments discussed herein are related to a technique for improving reliability of a distributed storage.

BACKGROUND

In a field of cloud storage, a replication technique for avoiding a data loss caused by a disk fault or a block fault by replicating data is widespread. In recent years, an erasure code technique that further improves reliability and capacity efficiency by efficiently encoding data to provide minimum redundancy has been actively researched and developed.

However, RAID, a representative method of the erasure code technique, needs to calculate parities from all disks to be made redundant, posing a problem such that a data transfer amount between nodes increases in a distributed storage and a network is bottlenecked.

Accordingly, a technique that reduces a data transfer amount in a network when a single disk is recovered by calculating some of the parities from not all but some of the disks in a cloud storage is presented.

Note that techniques described in the following documents are known.

Japanese Laid-open Patent Publication No. 2005-44182
Japanese Laid-open Patent Publication No. 2007-257630
Japanese Laid-open Patent Publication No. 07-200187

SUMMARY

According to an aspect of the embodiment, a storage system includes a plurality of data disks that store information, and a parity disk that corresponds to a disk group including some of the plurality of data disks, and stores parity information generated on the basis of data of the data disks included in the corresponding disk group. Any of the data disks is included in a plurality of the disk groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating a configuration of an implementation example of a storage system.

FIG. 10 is a first half of a flowchart illustrating a process in a fifth embodiment which is executed when a disk fault occurs.

FIG. 14 illustrates an example of a performance comparison between the fifth embodiment and the comparison examples.

DESCRIPTION OF EMBODIMENTS

Figure 2:
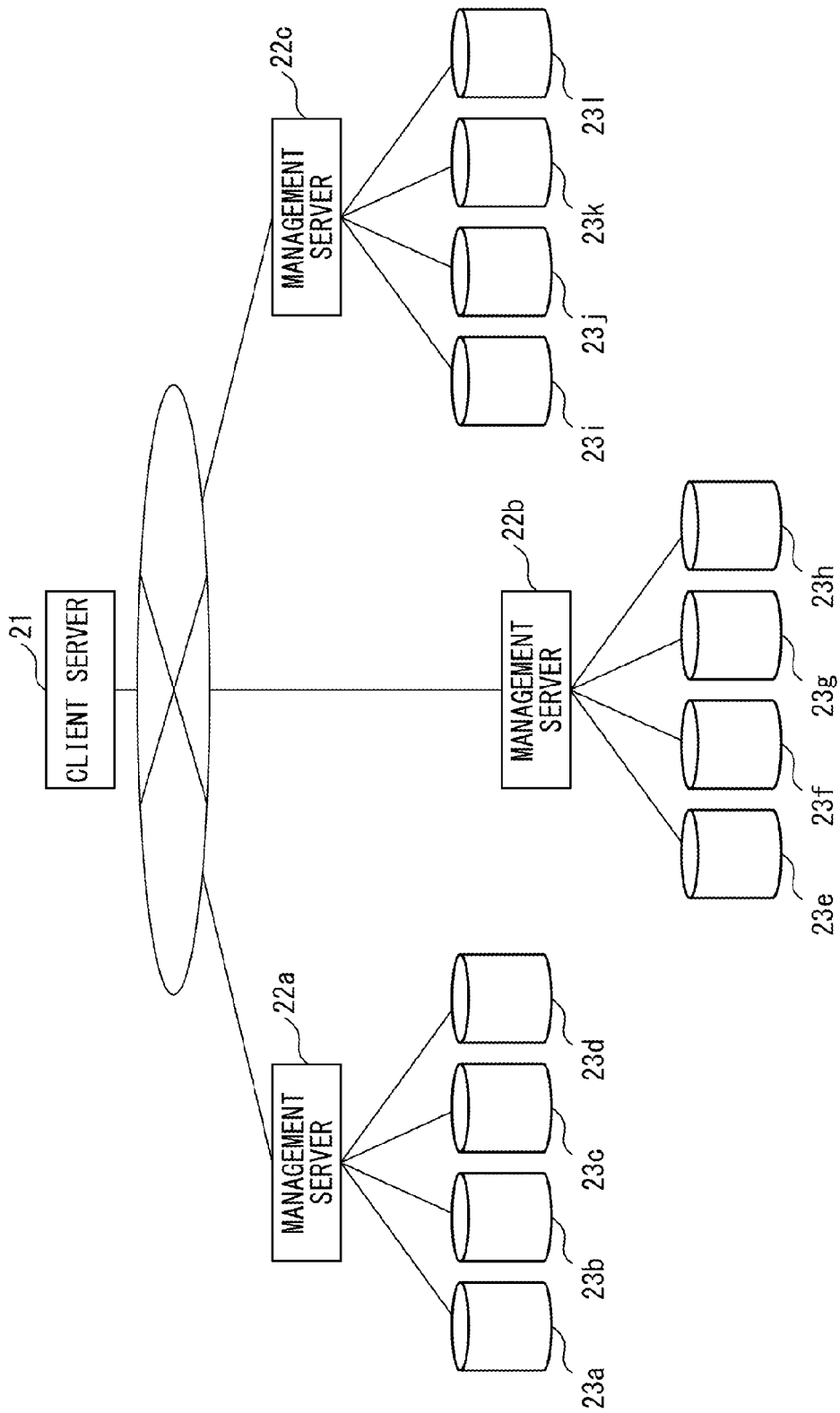
FIG. 2 illustrates an example of a configuration of an information processing system.
Figure 3:
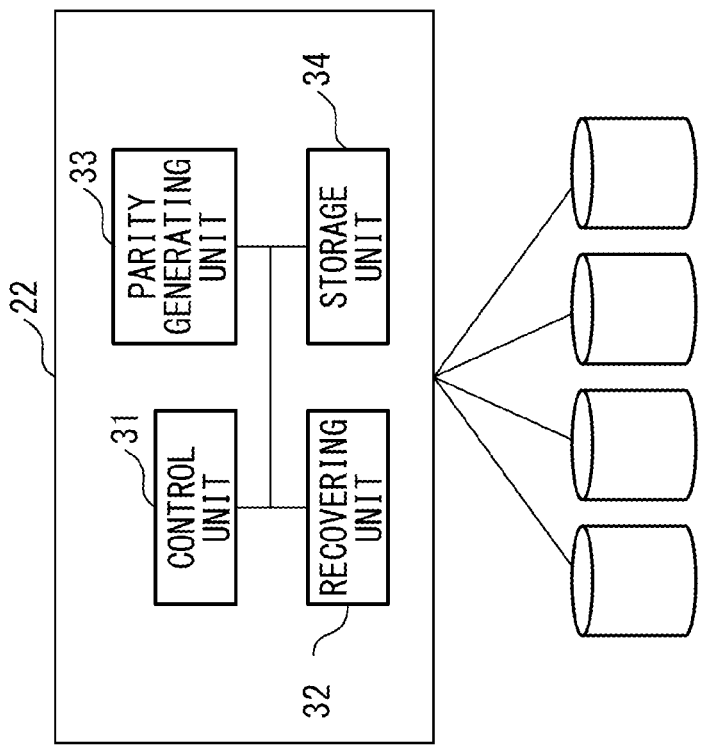
FIG. 3 illustrates an example of a configuration of a management server.

For example, in a system where some of the parities are arranged by being calculated from some of the disks, the parities are in some cases not suitably arranged to handle a multiple fault in the disks. In this case, it is needed to recover a disk by using a global parity (a parity calculated by using data of all disks) when a multiple fault occurs in the disks. Moreover, in this case, it is necessary to transfer data from an equal number of disks as that of data disks to nodes that respectively manage faulty disks.

According to an embodiment, a storage system that includes parity disks optimally arranged to recover a faulty disk can be provided.

FIG. 1 is a functional block diagram illustrating a configuration of an implementation example of a storage system. In FIG. 1, the storage system 1 includes data disks 2, parity disks 3, and a recovering unit 4.

The data disks 2 store information. The parity disks 3 correspond to a disk group including some of the plurality of data disks 2, and store parity information generated on the basis of data of data disks 2 included in a corresponding disk group. Moreover, any of the data disks 2 is included in a plurality of disk groups.

Each of the plurality of data disks 2 is included in any of the disk groups. Moreover, an equal number of data disks 2 is included in each of the disk groups.

The plurality of parity disks 3 are classified into a plurality of parity groups so that an arbitrary pair of parity disks 3 within each of the parity groups does not include the same data disk 2 in a corresponding disk group. Moreover, each of the data disks 2 is included in any of the disk groups corresponding to the parity disks 3 included in each of the parity groups.

Identification numbers are made to correspond respectively in ascending order to a storage order of data stripes of the data disks 2, and a minimum value of the identification numbers of the data disks 2 included in the disk group that corresponds to each of the parity disks 3 is shifted by a number calculated by dividing the number of data disks by the number of parity disks.

When a fault occurs in one or more data disks 2, the recovering unit 4 recovers data of each faulty data disk 2 by using a parity disk 3 corresponding to a disk group including the faulty data disk 2. Moreover, the recovering unit 4 selects a number of parity disks which is equal to that of the faulty data disks 2 so that all the faulty data disks 2 are included in disk groups corresponding to any of the parity disks 3 to be selected and the one or more faulty data disks 2 are included in the disk groups corresponding to all the parity disks 3 to be selected, and the recovering unit 4 recovers the data of the faulty data disks on the basis of the selected parity disks 3. Additionally, the recovering unit 4 selects a number of parity disks 3 which is equal to that of the faulty data disks 2 so that all the faulty data disks 2 are included in the disk groups of any of the parity disks 3 to be selected, the one or more faulty data disks 2 are included in the disk groups corresponding to all the parity disks 3 to be selected, and a sum of the sets of data disks 2 included in the disk groups corresponding to the parity disks 3 to be selected is minimized, and the recovering unit 4 recovers the data of the faulty data disks 2 on the basis of the selected parity disks 3.

First Embodiment

FIG. 2 illustrates an example of a configuration of an information processing system according to a first embodiment. The information processing system includes a client server 21, and a plurality of management servers 22 (22a to 22c). The client server 21 is connected to the plurality of management servers 22 via a network or a bus. To each of the plurality of management servers 22, a plurality of disks 23 (23a to 23l) are respectively connected. Data input and output to and from the disks are performed respectively by the management servers 22.

In the information processing system, a disk array including some of a plurality of disks is configured. For example, a disk array including the disk 23a, the disk 23e and the disk 23i is considered to be one disk array. Moreover, for example, a disk array including the disk 23a, the disk 23b and the disk 23c is considered to be another disk array.

The client server 21 accepts data from a user terminal, divides the accepted data, and transmits the divided data to the management servers 22 managing disks that configure a disk array.

Each of the management servers 22 receives data from the client server 21, and stores the received data on disks managed by the local management server 22.

Here, the data stored in a disk array is arranged sequentially by a specified size on different physical disks within the array. A dataset arranged on each of the disks by the specified size is referred to as a stlip. A dataset including a plurality of stlips is referred to as a stripe.

A storage space of a disk array includes a plurality of stripes. A disk array includes data disks and parity disks. The data disks are disks on which data from a user who uses the disk array is stored. The parity disks are disks on which parity information used to recover data of a data disk when a fault occurs in the disk is stored.

Each of the parity disks is made to correspond to a plurality of data disks, and parity information stored on the parity disk is calculated on the basis of data of the plurality of data disks made to correspond to the parity disk. The plurality of data disks made to correspond to the parity disk are sometimes referred to as data disks included in a calculation range of a parity disk in the following description. Parity information may be, specifically, a Reed-Solomon code, or information for correcting various types of errors.

In the first embodiment, data disks included in a calculation range of each parity disk are assumed to be not all but some of the data disks of a disk array. Here, a parity disk including some of the data disks as a calculation range is sometimes referred to as a local parity in the following description. Moreover, all local parities have mutually different calculation ranges. Additionally, each of the local parities is assumed to include at least one data disk common to a data disk included in a calculation range of at least one other local parity. Furthermore, each of the data disks included in a disk array is assumed to be able to be included in a calculation range of any of the local parities. Note that data disks included in a calculation range of each parity disk may be a plurality of consecutive data disks. When data disks are consecutive, this indicates a relationship between data disks, such that data is written as initial data of one stlip next to data written to the end of another stlip.

Each of the plurality of management servers 22 includes a control unit 31, a recovering unit 32, a parity generating unit 33, and a storage unit 34. The control unit 31 reads and writes data of a disk in response to a request issued from the client server 21 or a different management server 22, and returns a result of the read or the write to the request source. When a fault occurs in a data disk managed by the management server 22, the recovering unit 32 recovers data of the faulty data disk by using data of a local parity. The parity generating unit 33 calculates parity information by using data stored on data disks included in a calculation range of each local parity, and stores the calculated parity information in the local parity. The storage unit 34 makes an association between identification information of each local parity included in a disk array and identification information of data disks included in the calculation range of the local parity, and stores information which include the association as association information.

The following description refers to a case of k=10 and n=6 on the basis of the assumption that the number of all disks included in a disk array is n, the number of data disks is k, and the number of disks of a local parity is p=n−k.

Figure 4:
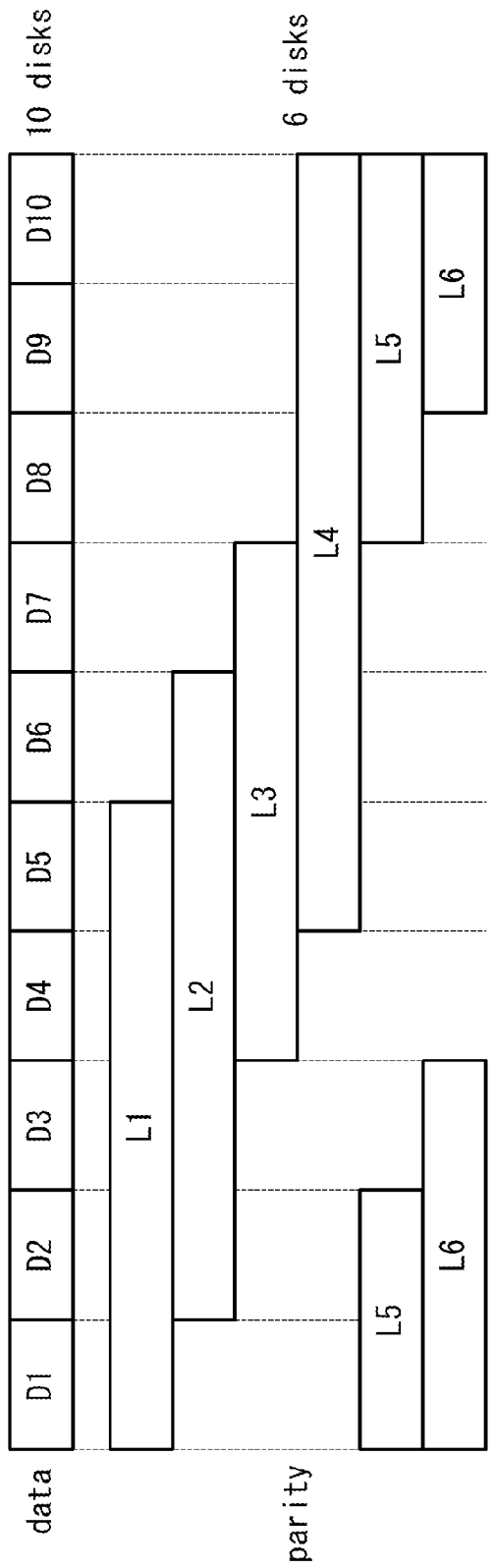
FIG. 4 illustrates an example of calculation ranges of local parities in a first embodiment.

FIG. 4 illustrates an example of calculation ranges of local parities. FIG. 4 illustrates an example of a disk array including ten data disks and six local parities. The data disks and the local parities are indicated by D1 to D10 and L1 to L6, respectively.

The local parity L1 includes the five data disks D1 to D5 as a calculation range. The local parities L2, L3, L4, L5 and L6 respectively include the data disks D2 to D6, D4 to D7, D5 to D10, D8 to D2, and D9 to D3 as a calculation range. Here, calculation ranges of all the local parities L1 to L6 are not the same, and the local parities respectively include at least one data disk common to at least one different local parity as a calculation range. Namely, for example, L1 includes, as a calculation range, the data disks D2 to D5 common to L2, and also includes the data disks D1 to D3 common to L6.

A case where a data disk is recovered when a fault occurs in the data disk is described next. When a fault occurs in a disk, the management server 22 that manages the faulty disk initially receives, from another device (such as a client server), a notification that the fault has occurred in the disk. Then, a standby disk intended to store data obtained by recovering contents of the faulty disk as a replacement for the faulty disk is allocated to the control unit 31 of the management server 22.

Next, the recovering unit 32 of the management server 22 selects a local parity used to recover the faulty disk from among a plurality of local parities included in a disk array, and recovers the data of the faulty data disk by using data of the selected local parity.

Specifically, the recovering unit 32 initially selects a combination of local parities, which satisfies the following three conditions (hereinafter referred to as selection conditions), as local parities to be used for the recovery. The first selection condition is that the number of elements of the combination of local parities be equal to that of faulty data disks. For example, when the number of faulty data disks is three, three local parities are selected as local parities included in the combination. The second selection condition is that each of the local parities included in the combination include at least one faulty data disk in a calculation range. Namely, a local parity that includes none of the faulty data disks in a calculation range is not selected as an element of the combination. The third selection condition is that each of the faulty data disks be able to be included in a calculation range of any of the local parities included in the combination.

A selection of a combination of local parities used for a recovery is described with reference to the example illustrated in FIG. 4. A case where a fault occurs in three data disks D2, D5 and D8 in the example illustrated in FIG. 4 is considered. A combination of local parities used for the recovery satisfies the selection conditions. In the example illustrated in FIG. 4, the number of faulty data disks is three. Therefore, three local parities are selected as data disks to be used for the recovery. Since the selected local parities include at least one of the faulty data disks as a calculation range, any of L1 to L6, which are local parities including at least one of D2, D5 and d8 as a calculation range, is selected. Moreover, a combination of local parities which satisfies the condition that each fault disk be able to be included in a calculation range of any of the calculation ranges of the three selected local parities is selected. Combinations of local parities, which include each of D2, D5 an dD8 as a calculation rage, are decided, for example, as follows.

In order for each of D2, D5 and D8 to be included in any of the calculation ranges of the three local parities, to avoid duplication local parities may be selected one at a time from a set of local parities each including D2, D5 and D8 as a calculation range. Namely, in FIG. 4, a set of local parities including D2 as a calculation range is {L1, L2, L5, L6}. A set of local parities including D5 as a calculation range is {L1, L2, L3, L4}. A set of local parities including D8 as a calculation range is {L4, L5}. At this time, to avoid duplication the local parities may be selected one at a time from the set of local parities each including D2, D5 an dD8 as a calculation range. Accordingly, the combination of local parities is any of (L1, L2, L4), (L1, L2, L5) (L1, L3, L4), (L1, L3, L5), (L1, L4, L5), (L2, L3, L4), (L2, L3, L5), (L2, L4, L5), (L5, L3, L4), (L6, L1, L4), (L6, L1, L5), (L6, L2, L4), (L6, L2, L5), (L6, L3, L4), (L6, L3, L5) and (L6, L4, L5). The recovering unit 32 selects any of these combinations as the combination of local parities used for the recovery.

After the recovering unit 32 selects any of the combinations of local parities which satisfy the selection conditions, the recovering unit 32 recovers the data of the faulty data disks by solving simultaneous linear equations with the use of a parity calculation expression by using the selected combination of local parities.

Specifically, after the recovering unit 32 initially selects the combination of local parities used for the recovery, the recovering unit 32 obtains data stored in the local parities of the selected combination, and data stored in data disks included in calculation ranges of the local parities of the selected combination. Note that, however, the faulty data disks are not regarded as targets to be obtained. For instance, in the example illustrated in FIG. 4, when (L1, L2, L5) is selected as the combination of local parities, the recovering unit 32 initially obtains data stored on the local parities L1, L2 and L5. At the same time, the recovering unit 32 obtains data stored on D1, D3, D4, D6, D9 and D10, which are data disks that are included in the calculation ranges of L1, L2 and L5 and are not faulty. The recovering unit 32 that has selected the combination may acquire data of a target to be obtained, for example by transmitting a request to acquire the data of the target to be obtained to the management server 22 that manages the disk on which the data to be obtained is stored, and by receiving a reply to the request to acquire the data of the target to be obtained. Moreover, the recovering unit 32 can identify a data disk included in the calculation range of the local parity by referencing association information stored in the storage unit 34.

The recovering unit 32 recovers the data of D2, D5 and D8 by solving simultaneous linear equations with three unknowns with the use of the parity calculation expression by using the obtained data of the local parities, and the data of the data disks included in the calculation ranges of the local parities.

Then, the recovering unit 32 stores the recovered data of D2, D5 and D8 on standby disks that are newly allocated to the respective data disks D2, D5 and D8, and completes the recovery.

When p=6, namely, when six local parities are present as illustrated in the example of FIG. 4, a maximum of six data disks can be recovered by solving linear equations with six unknowns with the use of the parity calculation expression of the six local parities.

A solution to linear equations with multiple unknowns can be obtained, for example by using various methods such as a discharge calculation or the like.

A recovery in a case where faulty disks include data disks and a local parity is described next. Assume that the faulty local parity includes a faulty data disk in a calculation range. When a fault occurs in a local parity that does not include a faulty data disk in a calculation range, the recovering unit 32 recreates the local parity by using data of normal data disks.

When faulty disks include data disks and a local parity, data of the faulty local parity cannot be used to recover data of the data disks. Therefore, the recovering unit 32 recovers the data of the data disks by using a normal local parity. Thereafter, the recovering unit 32 recovers (recreates) the data of the faulty local parity by using the recovered data of the data disks. For instance, when a fault occurs in L1, D5 and D8 in the example illustrated in FIG. 4, the recovering unit 32 initially recovers D5 and D8 by using a normal local parity. Thereafter, the recovering unit 32 recovers (recreates) parity information of L1 by using the recovered data of D5 and data of D1 to D4.

A recovery method used when faulty disks include data disks and a local parity is the same as that used to recover a data disk when a fault occurs in the data disk except that a faulty local parity is excluded as a local parity used for the recovery.

Specifically, the recovering unit 32 initially selects a combination of local parities under a condition that a fault does not occur in a local parity to be selected in addition to the above described three selection conditions in the selection of local parities used for the recovery.

The number of faulty data disks is two when a fault occurs in D5 and D8 in the example illustrated in FIG. 4. Therefore, two local parities are selected as data disks used for the recovery. Local parities to be selected are not faulty local parities and respectively include at least one faulty data disk as a calculation range. Therefore, any two of L2 to L5 are selected. Moreover, a combination of local parities which satisfies the condition that each faulty data disk be included in a calculation range of either of the two selected local parities is selected. Such a combination is any of (L2, L4), (L2, L5), (L3, L4), (L3, L5) and (L4, L5). The recovering unit 32 selects any of these combinations as a combination of local parities used for the recovery.

Then, the recovering unit 32 obtains data of the local parities of the selected combination, and data of data disks that are data disks included in calculation ranges of the local parities of the selected combination and are not faulty. The recovering unit 32 recovers the data of the faulty data disks by solving simultaneous linear equations with multiple unknowns with the use of the parity calculation expression by using the obtained data.

Upon completion of the recovery of the faulty data disks, the recovering unit 32 recreates a local parity by using the recovered data of the data disks, and data of other normal data disks included in the calculation range.

It has been assumed that a notification from another device is received when a fault occurs in a disk. However, the control unit 31 of the management server 22 that manages a faulty disk may detect a fault in the disk.

A recovery overhead is described next. In the first embodiment, a recovery overhead is defined as a data transfer amount of data received when a node that manages a faulty disk recovers the data. For simplification of an explanation, it is assumed that a data transfer amount of data stored on one disk is counted as 1.

When a single fault occurs, the number of data disks included in a calculation range of a local parity used for the recovery results in a recovery overhead remaining unchanged. In the following description, the number of data disks included in a calculation range of a local parity is sometimes referred to as a size of the calculation range of the local parity. For instance, in the example illustrated in FIG. 4, a recovery overhead when a single fault occurs is 6 at maximum. Here, a recovery overhead when a single fault occurs in L4 is described. The calculation range of L4 is six data disks D5 to D10. Accordingly, when a fault occurs in any of the data disks D5 to D10 and the disk is recovered by using L4, data of a total of six disks including the five data disks that are not faulty among D5 to D10 and L4, are transferred. Accordingly, the recovery overhead in this case is 6.

When a multiple fault occurs, a total of data of local parities of a selected combination, and data of data disks that are data disks included in calculation ranges of the local parities of the selected combination and are not faulty results in a recovery overhead. For example, when a double fault occurs in D2 and D5, which are recovered by using data of L1 and L6 in FIG. 4, data of the seven disks D1, D3, D4, D9, D10, L1 and L6 are transferred to the management servers that respectively manage D2 and D5. Accordingly, a recovery overhead in this case is 7. In the case of the configuration illustrated in FIG. 4, a recovery overhead when a double fault occurs in data disks is 6 or 7 (6.36 on average).

An overhead evaluation when an initial parity is generated is described next. In the first embodiment, an overhead when an initial parity is generated (initialization overhead) is defined as a data transfer amount of data received by the management server 22 of a local parity when parity information stored in the local parity is generated.

When an initial parity is generated, the parity generating unit 33 of the management server 22 of each local parity generates a parity by obtaining data of all data disks included in a calculation range of the local parity. Accordingly, an overhead when the initial parity is generated results in a data amount stored on a data disk in a calculation range of the local parity.

For instance, in the example illustrated in FIG. 4, a multi-to-multi data transfer is performed in parallel in such a way that data of D1 to D5 and those of D2 to D6 are respectively transferred to the management servers 22 of L1 and L2 when an initial parity is generated. Note that a data read from a data disk is performed only once by each of the management servers 22 (data read once is cached in a memory and transferred to a plurality of nodes).

In the example illustrated in FIG. 4, a local parity having a maximum calculation range is an L4 having a calculation range of 6. Therefore, when the initial parity is generated, data of six data disks are transferred at maximum. Accordingly, an initialization overhead in the system illustrated in FIG. 4 is 6.

For example, the initialization overhead in the first embodiment can be reduced in comparison with an initialization overhead in a disk array device having a global parity including all data disks as a calculation range. For instance, in a disk array device having a global parity including 10 data disks, the initialization overhead is 10. In the meantime, for instance, in the example illustrated in FIG. 4, the initialization overhead is 6. In this way, the initialization overhead can be reduced in the first embodiment.

An overhead evaluation when a new data disk is added is described next. In the first embodiment, an overhead when a new data disk is added is defined as the number of local parities for which parity information is recalculated when the new data disk is added to a disk array.

When a new data disk is added, parity information is recalculated in a local parity the calculation range of which is changed to include the new data disk.

For instance, a case where a new disk D'1 is added between D5 and D6 in FIG. 4 is considered. In this case, D'5 is added to the calculation ranges of L1, L2, L3 and L4. Therefore, the sizes of the calculation ranges of L1 to L4 increase by 1. The parity generating unit 33 of the management servers 22 that respectively manage L1 to L4 in which the calculation range has been changed obtains data of all the data disks included in the changed calculation range, and calculates parity information by using the obtained data. Then, the parity generating unit 33 stores the calculated parity information in a corresponding local parity.

In the meantime, since the calculation ranges of L5 and L6 remain unchanged, parity information is not recalculated. Accordingly, when the new disk D'5 is added in FIG. 4, four pieces of parity information of L1 to L4 are recalculated, so that an overhead when the new data disk is added is 4. As described above, in the first embodiment, a local parity in which the calculation range remains unchanged is present when a new data disk is added. Therefore, an overhead when a new data disk is added can be reduced.

Figure 5:
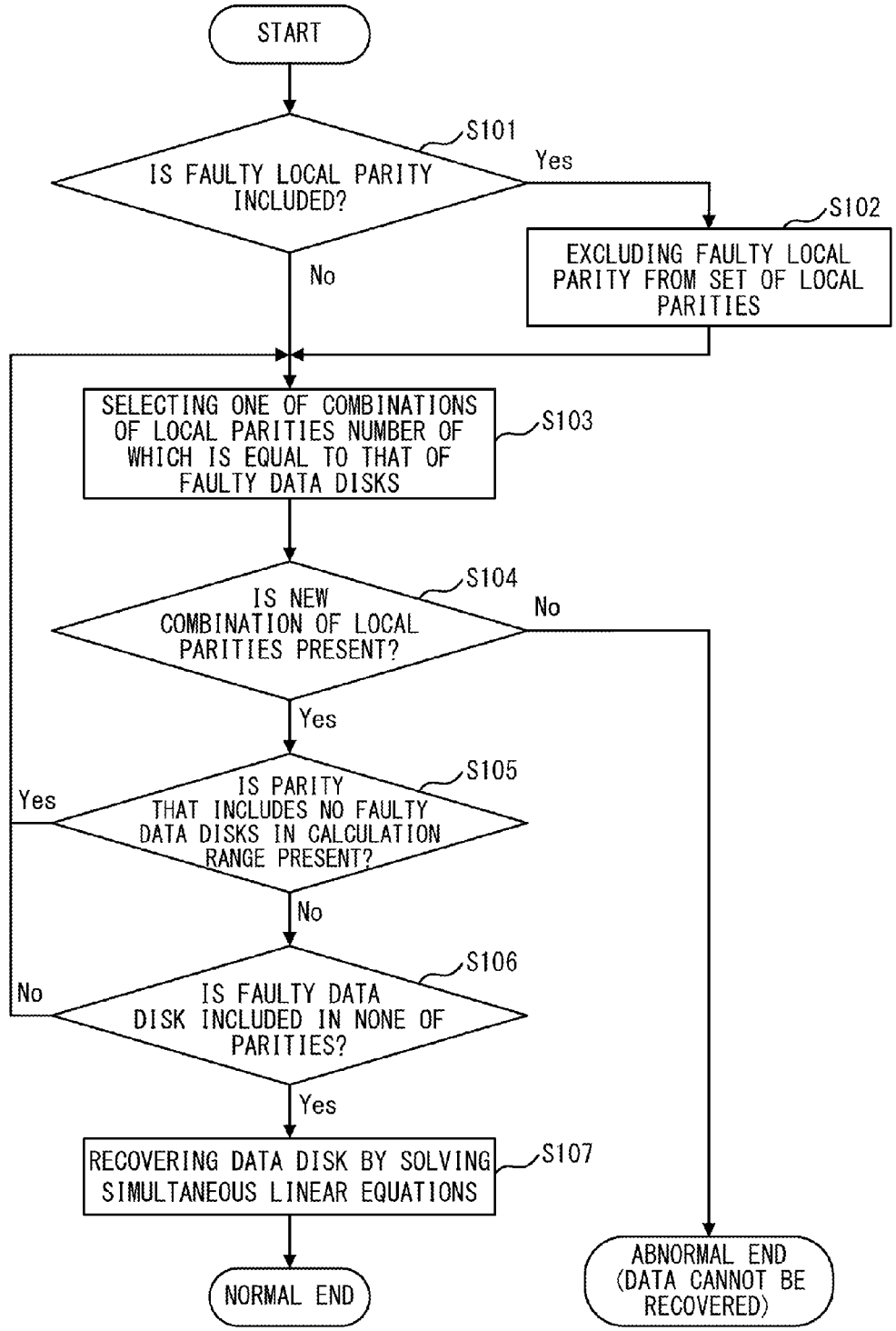
FIG. 5 is a flowchart illustrating a process in the first embodiment which is executed when a disk fault occurs.

FIG. 5 is a flowchart illustrating a process in the first embodiment which is executed when a disk fault occurs.

In FIG. 5, the recovering unit 32 initially determines whether or not a local parity is included in faulty disks (S101). If the local parity is included in the faulty disks ("YES" in S101), the recovering unit 32 excludes the faulty local parity from a set of local parities used for a recovery (S102). Then, the process proceeds to S103.

If the local parity is not included in the faulty disks in S101 ("NO" in S101), the recovering unit 32 selects one of the combinations of local parities where the number is equal to that of faulty data disks (S103). Here, the combination selected by the recovering unit 32 is assumed to be a combination of local parities which has not been selected yet in S103.

Next, the recovering unit 32 determines whether or not the combination selected in S103 is present (S104). If the recovering unit 32 determines that the combination is not present ("NO" in S104), the faulty data disk cannot be recovered. Therefore, the process is abnormally terminated.

In the meantime, if the recovering unit 32 determines that the combination is present ("YES" in S104), the recovering unit 32 further determines whether or not a local parity that includes none of the faulty data disks in a calculation range is present (S105). If the recovering unit 32 determines that the local parity that includes none of the faulty data disks in the calculation range is present ("YES" in S105), the process returns to S103.

In the meantime, if the recovering unit 32 determines that the local parity that includes none of the faulty data disks in the calculation range is not present in S105 ("NO" in S105), the recovering unit 32 further determines whether or not each of the faulty data disks are also not included in calculation ranges of the local parities of the selected combination (S106). If the recovering unit 32 determines that any one of the faulty data disks are not included in the calculation ranges of the local parities of the selected combination ("NO" in S106), the process returns to S103, and a new combination of local parities is selected.

In the meantime, if the recovering unit 32 determines that all the faulty data disks are included in the calculation ranges of any of the calculation ranges of the local parities of the selected combination ("YES" in S106), the recovering unit 32 recovers the data disks by solving simultaneous linear equations (S107). Specifically, the recovering unit 32 obtains data of the local parities of the combination selected in S103, and those of data disks included in the calculation ranges of the local parities of the selected combination. Note that, however, the faulty data disks are not regarded as targets to be obtained. Then, the recovering unit 32 recovers the data of the faulty data disks by solving the simultaneous linear equations with the use of the parity calculation expression by using the obtained data of the local parities and those of the data disks included in the calculation ranges of the local parities.

Then, the process is terminated normally.

Figure 6:
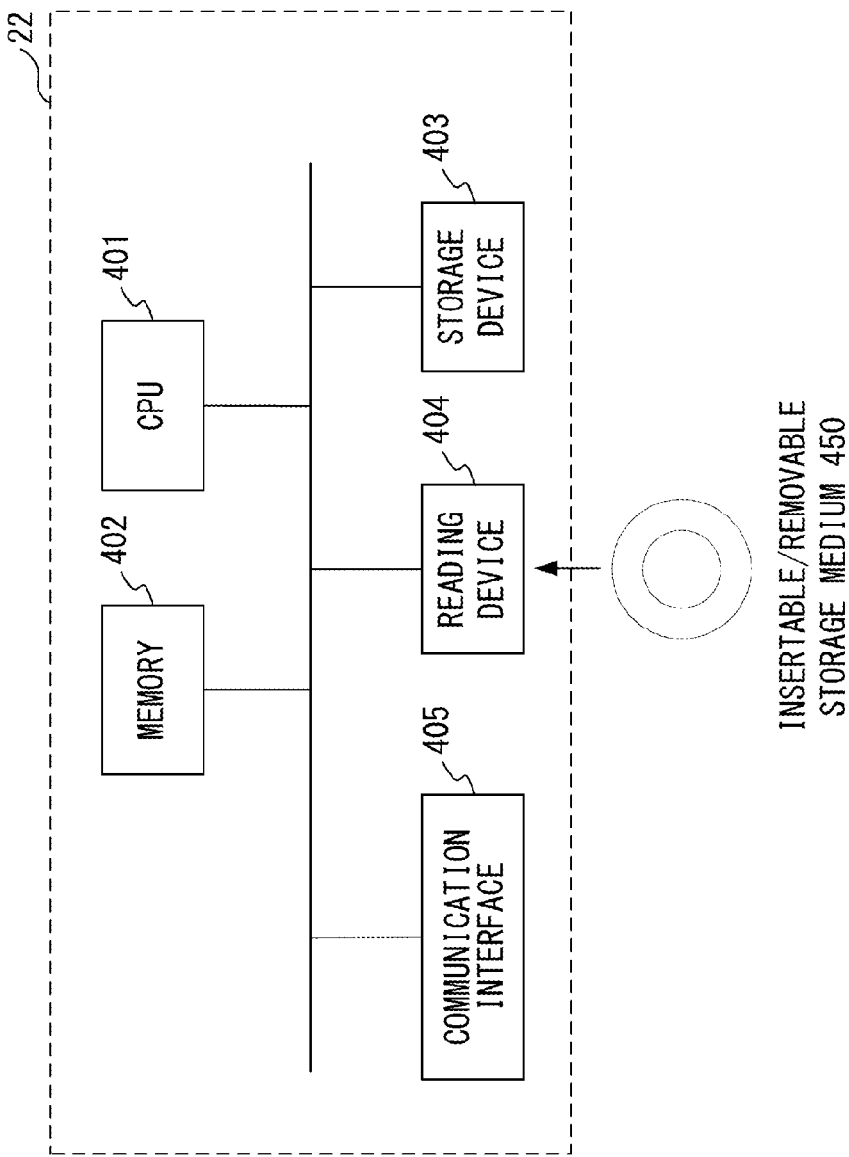
FIG. 6 illustrates an example of a hardware configuration of the management server.

A configuration of the management servers 22 is described next. FIG. 6 illustrates an example of a hardware configuration of the management servers 22.

Each of the management servers 22 includes a CPU (Central Processing Unit) 401, a memory 402, a storage device 403, a reading device 404 and a communication interface 405. The CPU 401, the memory 402, the storage device 403, the reading device 404 and the communication interface 405 are interconnected by a bus.

The CPU 401 provides all or some of the functions of the control unit 31, the recovering unit 32 and the parity generating unit 33 by executing a program that describes the steps of the above described flowcharts with the use of the memory 402.

The memory 402 is, for example, a semiconductor memory, and is configured by including a RAM (Random Access Memory) area and a ROM (Read Only Memory) area. The storage device 403 is, for example, a hard disk. The storage device 403 may be a semiconductor memory such as a flash memory or the like. Alternatively, the storage device 403 may be an external recording device. The storage device 403 provides all or some of the functions of the storage unit 34.

The reading device 404 accesses an insertable/removable storage medium 450 according to an instruction of the CPU 401. The insertable/removable storage medium 450 is implemented, for example, with a semiconductor device (USB memory or the like), a medium (such as a magnetic disk or the like) to/from which information is input/output with a magnetic action, a medium (such as a CD-ROM, a DVD or the like) to/from which information is input/output with an optical action, or the like. Note that the reading device 404 does not need to always be included in the management server 22.

The communication interface 405 transmits and receives data to and from the client server 21 and other management servers 22.

A program according to the embodiment is provided by the management server 22 in, for example, the following forms.
(1) Preinstalled in the storage device 403.
(2) Provided by the insertable/removable storage medium 450.
(3) Provided from a program server (not illustrated) via the communication interface 405.

Additionally, part of the management server 22 in this embodiment may be implemented with hardware. Alternatively, the management server 22 in this embodiment may be implemented by combining software and hardware.

Note that the client server 21 and the management server 22 may be included in the same housing, and the functions of the client server 21 and the management server 22 may be provided by the same CPU. Moreover, the management server 22 may be a controller module included in the storage device.

Furthermore, data disks and parity disks have been described by making a distinction between them in this embodiment. However, a physical disk on which parity information for each stripe is stored may be modified. Namely, data of one stripe and parity information of another stripe may be stored on the same physical disk.

In the first embodiment, a data transfer amount in a network can be reduced by using not a global parity but local parities even when an initial parity is generated or a double (multiple) fault occurs in disks. Accordingly, the length of time needed to recover data can be reduced. Moreover, a data transfer amount needed when consistency is checked may be reduced for a similar reason.

Additionally, the storage system according to the first embodiment supports a recovery performed when a fault occurs on a specified number of disks by making calculation ranges of local parities partially overlap even though only the local parities are employed. Moreover, it is needed to recalculate only some of the local parities when a new disk is added, whereby a data transfer amount can be reduced.

Second Embodiment

A second embodiment is configured so that the numbers of data disks included in calculation ranges (sizes of calculation ranges) of local parities become equal. As a result, whichever local parity starts to be recovered when data of a faulty data disk is recovered, a recovery overhead always becomes equal. Accordingly, an RTO (Recovery Time Objective) estimated in the worst case can be minimized. RTO is a target value of time needed from an occurrence of a fault in a disk until completion of a recovery of the disk.

A configuration of an information processing system according to the second embodiment is the same as that according to the first embodiment except that sizes of calculation ranges of local parities become equal.

Figure 7:
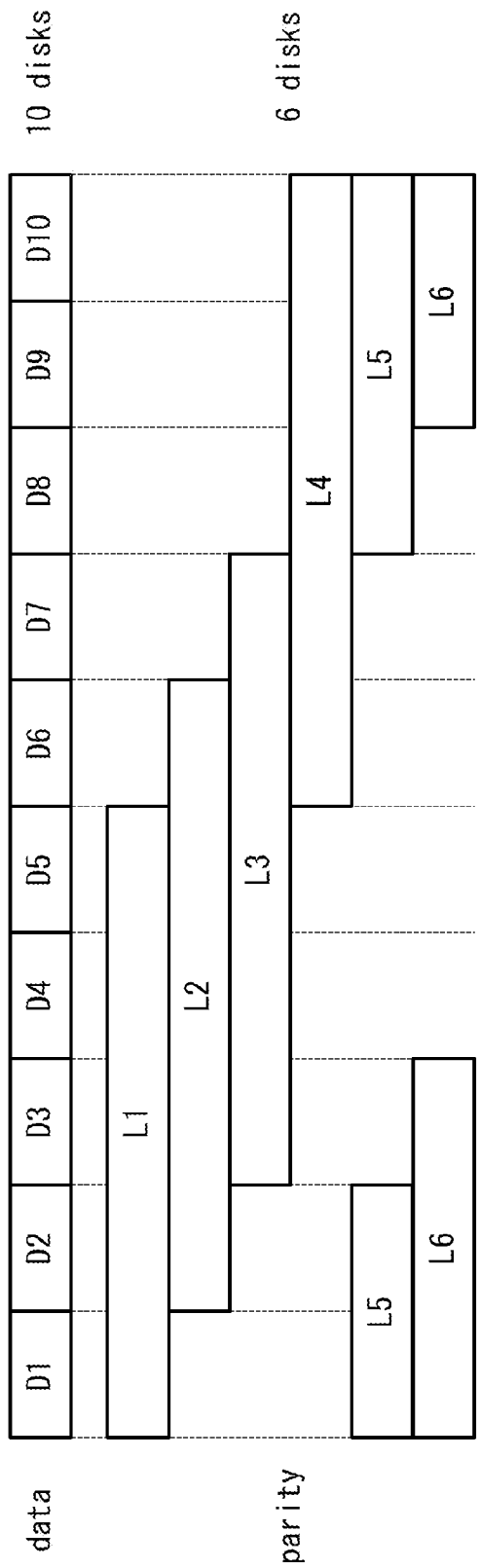
FIG. 7 illustrates an example of calculation ranges of local parities in a second embodiment.

FIG. 7 illustrates an example of calculation ranges of local parities in the second embodiment. FIG. 7 illustrates the example of a disk array including 10 data disks and six local parities. The data disks and the local parities are indicated by D1 to D10 and L1 to L6, respectively.

The local parity L1 includes five data disks D1 to D5 as a calculation range. Moreover, the local parities L2, L3, L4, L5 and L6 respectively include data disks D2 to D6, D3 to D7, D6 to D10, D8 to D2 and D9 to D3 as a calculation range. Here, none of the calculation ranges of the local parities L1 to L6 are the same, in a similar manner as in the first embodiment, and all include at least one data disk common to at least one other local parity as a calculation range.

Unlike the first embodiment, all calculation ranges of all the local parities L1 to L6 include an equal number of data disks, namely, five data disks included in their calculation range in the example illustrated in FIG. 7.

A recovery method used when a fault occurs in a disk is similar to that in the first embodiment. However, a recovery overhead becomes equal whichever combination is selected from among combinations that satisfy the selection conditions in a selection of a combination of local parities used for a recovery.

When a single fault occurs, a size of a calculation range of a local parity used for the recovery results in a recovery overhead remaining unchanged. Accordingly, in the example illustrated in FIG. 7, the size of the calculation range of each of the local parities is 5. Therefore, the recovery overhead when a single fault occurs is 5.

When a multiple fault occurs, a total of data of local parities of a selected combination and those of data disks that are included in calculation ranges of the local parities of the selected combination and are not faulty results in a recovery overhead. Accordingly, when a double fault occurs, for example, in D2 and D5 in FIG. 7 and D2 and D5 are recovered by using data of L1 and L6, data of seven disks D1, D3, D4, D9, D10, L1 and L6 are transferred to the management servers that respectively manage D2 and D5.

In the system according to the second embodiment, RTO estimated in the worst case can be minimized in comparison with the first embodiment.

Third Embodiment

In a third embodiment, local parities are classified into a plurality of groups so that all data disks respectively included in calculation ranges may differ. Moreover, the local parities are classified so that each of the data disks is included in any of the calculation ranges of local parities included in each of the groups.

A configuration of an information processing system according to the third embodiment is the same as that in the second embodiment except that local parities are classified into groups.

In the third embodiment, all data disks are included in calculation ranges of a number of local parities equal to that of the groups, and a number of faults of disks equal to that of the groups can be recovered. Namely, a minimum Hamming distance increases, improving an evaluation of reliability.

Figure 8:
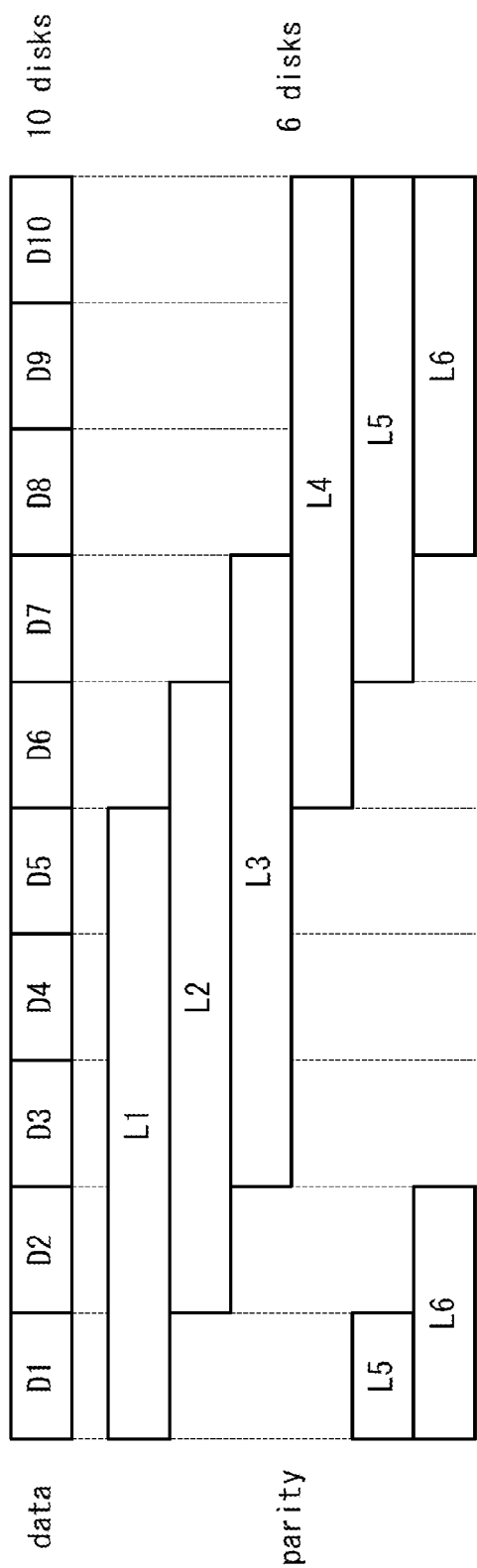
FIG. 8 illustrates an example of calculation ranges of local parities in a third embodiment.

FIG. 8 illustrates an example of calculation ranges of local parities in the third embodiment. FIG. 8 illustrates an example of a disk array including 10 data disks and six local parities. Moreover, the data disks and the local parities are indicated by D1 to D10 and L1 to L6, respectively.

The local parity L1 includes the five data disks D1 to D5 as a calculation range. Moreover, the local parities L2, L3, L4, L5 and L6 respectively include D2 to D6, D3 to D7, D6 to D10, D7 to D1 (D7, D8, D9, D10, D1), and D8 to D2 (D8, D9, D10, D1, D2) as a calculation range. Here, none of L1 to L6 have the same calculation range, and all include at least one data disk common to at least one other local parity as a calculation range.

In the third embodiment, local parities are classified into a plurality of groups. The classification of local parities into groups is performed so that all data disks respectively included in calculation ranges of the local parities within the same group may differ. In other words, the local parities are classified into the plurality of groups so that an arbitrary pair of local parities within the group does not include the same data disk in a calculation range. Moreover, the local parities are classified so that each of the data disks may be included in any of the calculation ranges of the local parities included in each of the groups.

In the example illustrated in FIG. 8, the local parities are classified into three groups so that L1 and L4, L2 and L5, and L3 and L6 are respectively included in the same group.

Data disks included in the calculation range of L1 are D1 to D5, whereas those included in the calculation range of L4 are D6 to D10. Accordingly, in the group of L1 and L4, all the data disks included in each calculation ranges of the local parities are different. In other words, the data disks included in the calculation ranges of L1 and L4 are not redundant. Moreover, each of the data disks D1 to D10 that configure the disk array is included in either of the calculation ranges of L1 and L4.

In the example of FIG. 7 referred to in the second embodiment, the number of local parities that include D2 and D3 in the calculation range is 4, whereas the number of local parities that include D7 and D8 in the calculation range is 2. This means that a data loss rate varies depending on a data disk. For example, when a single fault occurs, the data disk D2 can be recovered unless a fault occurs in all of the four local parities L1, L2, L5 and L6. However, the data disk D7 cannot be recovered if a fault occurs in the local parities L3 and L4. In the example illustrated in FIG. 7, the minimum Hamming distance is 3, deteriorating an evaluation of reliability.

In comparison with this, in the example of the third embodiment illustrated in FIG. 8, all the data disks are included in the calculation ranges of a number of the local parities equal to that of the groups. Namely, data loss rates of all of D1 to D10 are equal. For example, when a single fault occurs, the data disks D1 to D10 can be recovered unless a fault occurs in the three local parities which include each of the data disks in the calculation range, and the minimum Hamming distance is 4. Accordingly, the evaluation of reliability is improved in comparison with the example illustrated in FIG. 7.

Fourth Embodiment

In a fourth embodiment, calculation ranges of all local parities included in a disk array are configured to be shifted by an equal interval. Namely, initial data disks of the calculation ranges of all the local parities are configured to be shifted by (the number of data disks)/(the number of local parities). When k can be divided by p, starting positions of the calculation ranges of the local parities can be arranged at equal intervals on the data disks. Otherwise, the starting positions are arranged at almost equal intervals by using an integer before or after a value calculated by dividing k by p. For example, when k=10 and p=6, k cannot be divided by p (k/p=1.67). Therefore, an interval between the starting positions is set to 1 or 2.

A configuration of an information processing system according to the fourth embodiment is the same as that according to the third embodiment except that calculation ranges of all local parities included in a disk array are configured to be shifted by an equal interval.

Figure 9:
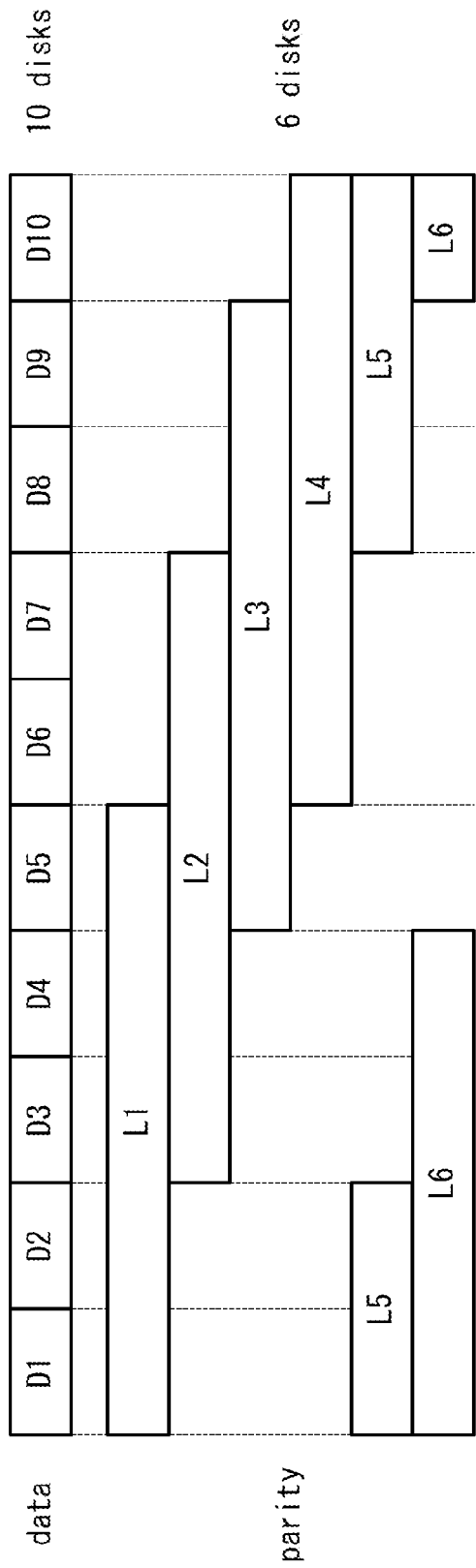
FIG. 9 illustrates an example of calculation ranges of local parities in a fourth embodiment.

FIG. 9 illustrates an example of calculation ranges of local parities in the fourth embodiment. FIG. 9 illustrates an example of a disk array including 10 data disks and six local parities. The data disks and the local parities are indicated by D1 to D10 and L1 to L6, respectively. Assume that identification numbers D1 to D10 are respectively assigned in ascending order to a storage order of data stripes of the data disks 2.

The local parity L1 includes the five data disks D1 to D5 as a calculation range. Moreover, the local parities L2, L3, L4, L5 and L6 respectively include the data disks D3 to D7, D5 to D9, D6 to D10, D8 to D2 (D8, D9, D10, D1, D2), and D10 to D4 (D10, D1, D2, D3, D4) as a calculation range. Here, none of the local parities L1 to L6 have the same calculation range, and all include at least one data disk common to at least another local parity as a calculation range, similarly to the first embodiment.

In the example illustrated in FIG. 9, (the number of data disks)/(the number of local parities)=10/6=1.67. Therefore, calculation range starting positions of the local parities are shifted by 1 or 2. This makes it easier to select local parities having close calculation range starting positions when a plurality of data disks are recovered. As a result, the number of data disks included in a calculation range of a local parity decreases, so that a recovery overhead can be reduced.

A recovery method used when a fault occurs in a disk is similar to that in the first embodiment. However, for instance, when a fault occurs in D3 and D8 in the example illustrated in FIG. 9, L2 and L3 can be selected as a combination of local parities used to recover the data disks. When the data of D3 and D8 are recovered by using L2 and L3, data to be transferred for the recovery are data of six data disks D4, D5, D6, D7, L2 and L3. Accordingly, a recovery overhead in this case is 6.

In the meantime, in the case of the example of FIG. 8 in the third embodiment, when a fault occurs in D3 and D8, L3 and L4 can be selected as a combination of local parities used to recover the data disks. When the data of D3 and D8 are recovered by using L3 and L4, data to be transferred for the recovery are data of the eight disks D4, D5, D6, D7, D9, D10 L2 and L3. Accordingly, a recovery overhead in this case is 8. Therefore, according to the fourth embodiment, a recovery overhead can be reduced in comparison with the third embodiment.

As described above, the fourth embodiment is configured so that calculation range starting positions of local parities are shifted by an equal interval, whereby a recovery overhead can be reduced.

Fifth Embodiment

When the number of faulty disks is smaller than that of local parities, arbitrariness occurs in a combination of local parities used for a recovery. In a fifth embodiment, a combination is selected so that a sum of the sets of data disks included in calculation ranges of all local parities included in a combination may be minimized in a selection of a combination of local parities used for the recovery.

For instance, a case where a fault occurs in the two data disks D1 and D2 in the example illustrated in FIG. 9 is considered. In this case, there are three combinations of local parities which satisfy the selection conditions, (L1, L5), (L1, L6) and (L5, L6). By using any of these three combinations, the two data disks D1 and D2 can be recovered.

In the fifth embodiment, the combination of local parities used for the recovery is selected so that a sum of the sets of data disks included in calculation ranges of all local parities included in a combination among combinations of local parities which satisfy the selection conditions may be minimized. In the example illustrated in FIG. 9, in the case of the combination (L1, L5), a sum of the sets of data disks included in the calculation ranges of L1 and L5 is 8 disks {D1, D2, D3, D4, D5, D8, D9, D10}. In the case of the combination (L1, L6), a sum of the sets of data disks included in the calculation ranges of L1 and L6 is 6 data disks {D1, D2, D3, D4, D5, D10}. In the case of the combination (L5, L6), a sum of the sets of data disks included in the calculation ranges of L5 and L6 is 7 data disks {D1, D2, D3, D4, D8, D9, D10}. Accordingly, a combination that minimizes a sum of the sets of data disks included in calculation ranges of local parities is (L1, L6). Accordingly, the recovering unit 32 selects the combination of (L1, L6) as the combination of local parities used for the recovery.

In the following description, a sum of the sets of data disks included in calculation ranges of all local parities included in a combination is sometimes referred to as a sum of the sets of calculation ranges of a combination.

Figure 11:
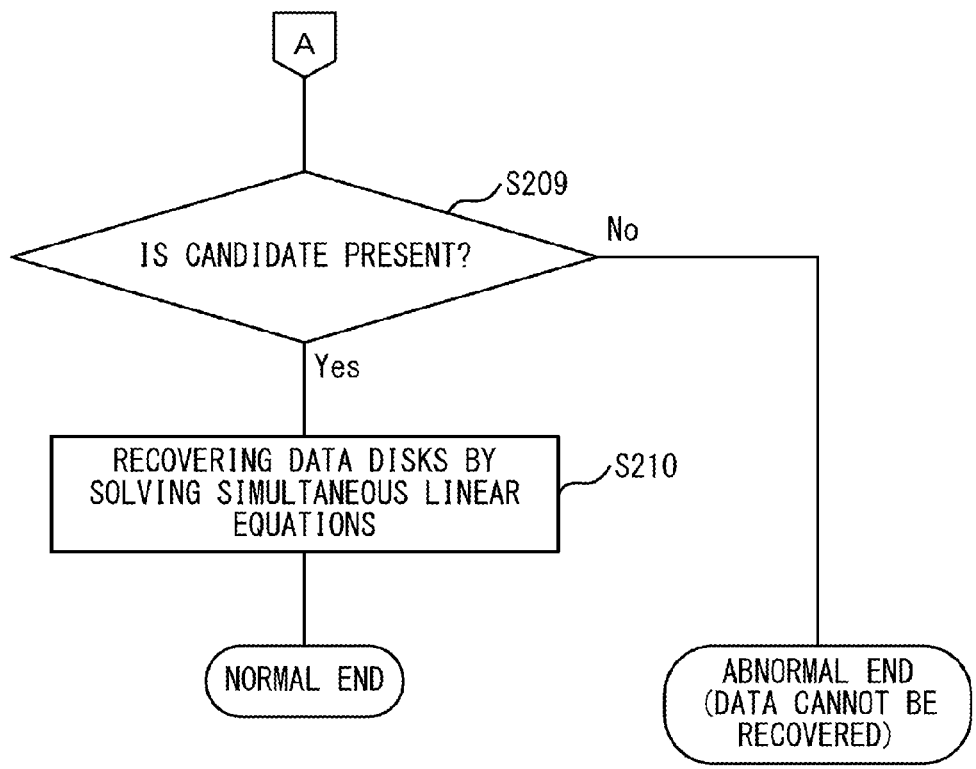
FIG. 11 is a latter half of the flowchart illustrating the process in the fifth embodiment which is executed when the disk fault occurs.

Operations of a process executed when a disk fault occurs in the fifth embodiment are described next with reference to FIGS. 10 and 11. FIG. 10 is the first half of a flowchart illustrating the process in the fifth embodiment which is executed when a disk fault occurs. FIG. 11 is the latter half of the flowchart illustrating the process in the fifth embodiment which is executed when the disk fault occurs.

In FIG. 10, the recovering unit 32 initially determines whether or not a local parity is included in faulty disks (S201). If the local parity is included in the faulty disks ("YES" in S201), the recovering unit 32 excludes the faulty local parity from a set of local parities used for a recovery (S202). Then, the process proceeds to S203.

If the local parity is not included in the faulty disks in S201 ("NO" in S201), the recovering unit 32 selects one of the combinations of local parities, the number of which is equal to that of the faulty data disks (S203). Here, assume that the combination selected by the recovering unit 32 is a combination that has not been selected yet by the recovering unit 32 in S203.

Next, the recovering unit 32 determines whether or not the combination selected in S203 is present (S204).

If the recovering unit 32 determines that the combination is present ("YES" in S204), the recovering unit 32 further determines whether or not a local parity including no faulty data disks in a calculation range is present in the combination selected in S203 (S205). If the recovering unit 32 determines that the local parity including no faulty data disks in the calculation range is present ("YES" in S204), the process returns to S203.

In the meantime, if the recovering unit 32 determines that the local parity including no data disks in the calculation range is not present ("NO" in S205), the recovering unit 32 further determines whether or not the faulty data disk is included in none of the calculation ranges of the local parities in the combination selected in S203 (S206). If the recovering unit 32 determines that the faulty data disk is included in none of the local parities in the selected combination ("NO" in S206), the process returns to S203, in which a new combination of local parities is selected.

In the meantime, if the recovering unit 32 determines that all the faulty data disks are included in any of the calculation ranges of the local parities in the combination selected in S203 ("YES" in S206), the recovering unit 32 makes a comparison between a combination candidate and a number of a sum of the sets of calculation ranges (S207). Here, the combination candidate is a candidate set in S208. Specifically, if the combination candidate is present, the recovering unit 32 determines whether or not the sum of the sets of calculation ranges of the combination most recently selected in S203 is larger than a sum of the sets of calculation ranges of the combination candidate. If the recovering unit 32 determines that the sum of the sets of the calculation ranges of the combination most recently selected in S203 is larger than the sum of the sets of calculation ranges of the combination candidate ("YES" in S207), the process returns to S203, in which a new combination of local parities is selected.

In the meantime, if the recovering unit 32 determines that the sum of the sets of calculation ranges of the combination most recently selected in S203 is not larger than the sum of the sets of calculation ranges of the combination candidate ("NO" in S207), the recovering unit 32 resets the combination most recently selected in S203 as a combination candidate (S208). Then, the process returns to S203, in which a new combination of local parities is selected.

If the recovering unit 32 determines that the combination is not present in S204 ("NO" in S204), the recovering unit 32 further determines whether or not a combination candidate is present (S209) (see FIG. 11). Here, the combination candidate is the combination set in S208. If the recovering unit 32 determines that the combination candidate is present ("YES" in S209), the recovering unit 32 recovers the data disks by solving simultaneous linear equations with the use of the combination candidate (S210). Specifically, the recovering unit 32 obtains data of local parities of the combination candidate, and those of data disks included in the calculation ranges of the local parities of the combination candidate. Note that, however, the faulty data disks are not regarded as targets to be obtained. Then, the recovering unit 32 recovers the data of the faulty data disks by solving simultaneous linear equations with the use of the parity calculation expression by using the obtained data of the local parities and those of the data disks included in the calculation ranges of the local parities. Then, the process is terminated normally.

If the recovering unit 32 determines that the combination candidate is not present in S209 ("NO" in S209), the faulty data disks cannot be recovered. Therefore, the process is terminated abnormally.

Comparison examples 1 and 2 are described next to help understanding of advantages of the first to the fifth embodiments.

Figure 12:
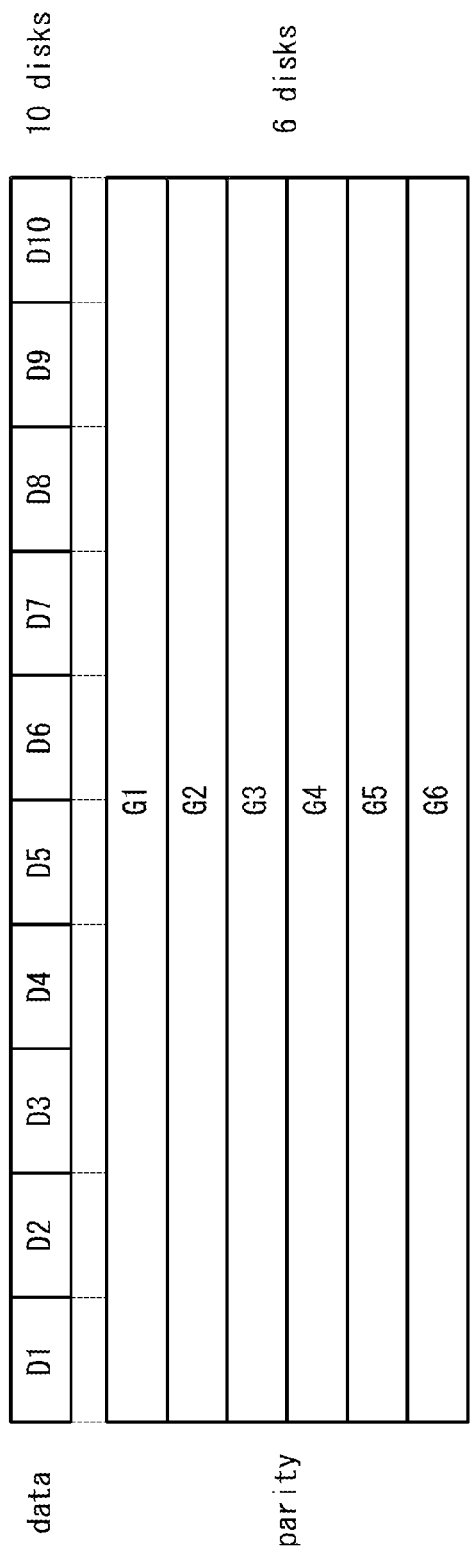
FIG. 12 illustrates an example of a data configuration in a comparison example 1.

FIG. 12 illustrates an example of a data configuration of the comparison example 1. In a distributed storage of the comparison example 1, parity information is calculated by using data of all disks to be made redundant. Namely, in FIG. 12, parity disks (global parities) G1 to G6 are configured by including all data disks in a calculation range.

Figure 13:
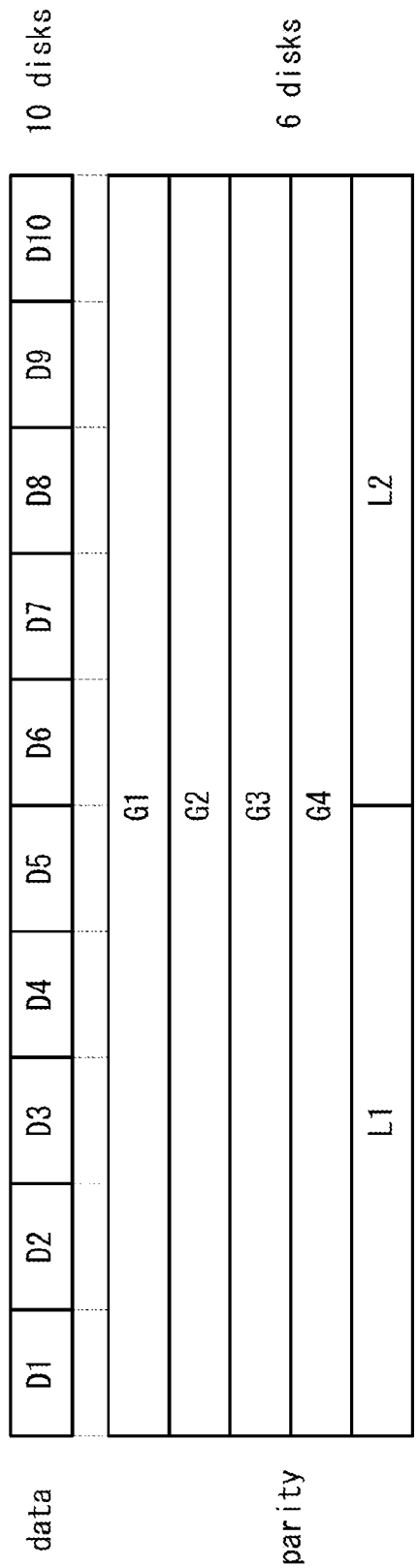
FIG. 13 illustrates an example of a data configuration in a comparison example 2.

FIG. 13 illustrates an example of a data configuration of the comparison example 2. In a distributed storage of the comparison example 2, parity information is calculated by using some of the local parities. Namely, in the example illustrated in FIG. 13, parity disks (global parities) G1 to G4 are configured by including all data disks in a calculation range, and local parities L1 and L2 are configured by including mutually exclusive data disks in a calculation range. Here, the local parities L1 and L2 do not include a data disk common to each other in the calculation ranges in the comparison example 2.

FIG. 14 illustrates a performance comparison between the fifth embodiment and the comparison examples. In FIG. 14, a record of the comparison example 1 (10, 6) indicates performance information of the comparison example 1 where 10 data disks and six parity disks are included, as in the configuration illustrated in FIG. 12. A record of the comparison example 2 (10, 6, 5) indicates performance information of the comparison example 2 where 10 data disks and six parity disks are included and the number of data disks included in the calculation ranges of the local parities is 5, as in the configuration illustrated in FIG. 13. A record of the fifth embodiment (10, 6, 5) indicates performance information of the fifth embodiment where 10 data disks and six parity disks are included and the number of data disks included in the calculation ranges of the local parities is 5. Assume that starting positions of the calculation ranges of the parity disks in the fifth embodiment (10, 6, 5) are distributed at equal intervals as in the fourth embodiment. A record of a replication (10×3) indicates performance information of the information processing system having a configuration implemented by replicating (duplicating) data disks triply.

A capacity efficiency indicates an actually available disk capacity obtained by subtracting redundant data from capacities of all disks used in a disk array. Capacity efficiencies in the comparison example 1 (10, 6), the comparison example 2 (10, 6, 5), the fifth embodiment (10, 6, 5), and the replication (10×3) are 0.625, 0.625, 0.625 and 0.33, respectively.

A minimum Hamming distance of data disks indicates a value of the minimum Hamming distance in a case where a fault occurs only in data disks. Minimum Hamming distances of data disks in the comparison example 1 (10, 6), the comparison example 2 (10, 6, 5), and the fifth embodiment (10, 6, 5) are 7, 7 and 7, respectively.

A minimum Hamming distance of all disks indicates a value of the minimum Hamming distance targeting a case where a fault occurs in all disks including parity disks (local parities). Minimum Hamming distances of all the disks in the comparison example 1 (10, 6), the comparison example 2 (10, 6, 5), the fifth embodiment (10, 6, 5), and the replication (10×3) are 7, 6, 4 and 3, respectively.

An overhead of a write process indicates a value of the number of inputs/outputs (the number of read/write processes) when a write process occurs in one block of a data disk. In the case of the comparison example 1 (10, 6), reads/writes of data from/to a block desired to be updated and those of data to/from all the parity disks G1 to G6 occur. Therefore, the overhead of the write process is 14. In the case of the comparison example 2 (10, 6, 5), reads/writes of data from/to a block desired to be updated, those of data from/to the five global parities G1 to G4, and those of data from/to either of L1 and L2 occur. Therefore, the overhead of the write process is 12. In the case of the fifth embodiment (10, 6, 5), reads/writes of data from/to a block desired to be updated and those of data from/to any three of the local parities L1 to L6 occur. Therefore, the overhead of the write process is 8. In the case of the replication (10×3), writes of data to all data disks occur. Therefore, the overhead of the write process is 3. Accordingly, compared with the comparison examples 1 and 2, the write overhead can be reduced in the fifth embodiment.

A recovery overhead at the time of a single fault indicates a value of a recovery overhead when a single fault occurs. Here, the recovery overhead is a data transfer amount of data received by a management server that manages a faulty disk at the time of a recovery. In the case of the comparison example 1 (10, 6), a read from any of the parity disks and that from nine data disks that are not faulty occur. Therefore, the recovery overhead at the time of the single fault is 10. In the case of the comparison example 2 (10, 6, 5), a read from any of the local parities and that from four data disks that are included in the calculation range of the local parity and are not faulty occur. Therefore, the recovery overhead at the time of the single fault is 5. In the case of the fifth embodiment (10, 6, 5), a read from any of the local parities including a faulty data disk in a calculation range and that from four data disks that are included in the local parity and are not faulty occur. Therefore, the recovery overhead at the time of the single fault is 5. In the case of the replication (10×3), a read from a normal disk occurs. Therefore, the recovery overhead at the time of the single fault is 1. Accordingly, compared with the comparison example 1, the recovery overhead at the time of the single fault can be reduced in the fifth embodiment.

Similarly, values of a recovery overhead at the time of a double fault in the comparison example 1 (10, 6), the comparison example 2 (10, 6, 5), the fifth embodiment (10, 6, 5), and the replication (10×3) are 11, 10 or 11, 7 or 8 (7.36 on average), and 2, respectively. Accordingly, compared with the comparison examples 1 and 2, the recovery overhead at the time of the double fault can be reduced in the fifth embodiment.

Similarly, values of a recovery overhead at the time of a triple fault in the comparison example 1 (10, 6), the comparison example 2 (10, 6, 5), and the fifth embodiment (10, 6, 5) are 12, 12, and 9, respectively. Note that data cannot be recovered in the replication (10×3) at the time of the triple fault. Accordingly, compared with the comparison examples 1 and 2, the recovery overhead at the time of the triple fault can be reduced in the fifth embodiment.

An overhead of a scrub process is a data transfer amount that occurs in a process for checking data consistency (completeness). Overheads of the scrub process in the comparison example 1 (10, 6), the comparison example 2 (10, 6, 5), the fifth embodiment (10, 6, 5), and the replication (10×3) are 15, 15, 15 and 20, respectively.

As illustrated in FIG. 14, the fifth embodiment does not have the worst value in any of the entries, and is well-balanced.

The embodiment is not limited to the above described embodiments, and can take various configurations or embodiments within a scope that does not depart from the gist of the present invention.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
a plurality of data disks that store information; and
a parity disk that corresponds to a disk group including some of the plurality of data disks, and stores parity information generated on the basis of data of the data disks included in the corresponding disk group, wherein
any of the data disks is included in a plurality of the disk groups,
a plurality of parity disks are classified into a plurality of parity groups so that an arbitrary pair of parity disks within each of the parity groups does not include the same data disk in the corresponding disk group, and
each of the plurality of data disks is included in any of the disk groups corresponding to the parity disk included in each of the parity groups.

2. The storage system according to claim 1, wherein
the number of data disks included in each of the disk groups is equal in the disk groups.

3. The storage system according to claim 1, the storage system further comprising
a recovering unit configured to recover data of a faulty data disk by using the parity disk corresponding to the disk group including the faulty data disk when a fault occurs in one or more data disks.

4. The storage system according to claim 3, wherein
the recovering unit selects a number of parity disks which is equal to the number of the faulty data disks so that all the faulty data disks are included in the disk group corresponding to any of the parity disks to be selected and one or more the faulty data disks are included in the disk groups corresponding to all the parity disks to be selected, and the recovering unit recovers the data of the faulty data disks on the basis of the selected parity disks.

5. The storage system according to claim 4, wherein
the recovering unit selects a number of parity disks which is equal to the number of the faulty data disks so that all the faulty data disks are included in the disk group corresponding to any of the parity disks to be selected, the one or more faulty data disks are included in the disk groups corresponding to all the parity disks to be selected, and a sum of the sets of the data disks included in the disk groups corresponding to the parity disks to be selected is minimized, and
the recovering unit recovers the data of the faulty data disks on the basis of the selected parity disks.

6. A storage system comprising:
a plurality of data disks that store information; and
a parity disk that corresponds to a disk group including some of the plurality of data disks, and stores parity information generated on the basis of data of the data disks included in the corresponding disk group, wherein
any of the data disks is included in a plurality of the disk groups, wherein
identification numbers are made to correspond respectively in ascending order to a storage order of data stripes of the data disks, and a minimum value of the identification numbers of the data disks included in the disk groups each corresponding to the parity disk is shifted by a number calculated by dividing the number of data disks by the number of parity disks.

7. A non-transitory computer-readable recording medium having stored therein a program for causing a computer to execute a process, the process comprising:
recovering data of a faulty data disk by using a parity disk corresponding to a disk group including the faulty data disk when a fault occurs in one or more data disks in a storage system including a plurality of data disks that store information, and a parity disk that corresponds to a disk group including some of the plurality of data disks and that stores parity information generated on the basis of data of the data disks included in the corresponding disk group, wherein any of the data disks is included in the plurality of disk groups in the storage system, wherein
a plurality of parity disks are classified into a plurality of parity groups so that an arbitrary pair of parity disks within each of the parity groups does not include the same data disk in the corresponding disk group, and
each of the plurality of data disks is included in any of the disk groups corresponding to the parity disk included in each of the parity groups.

* * * * *